R. MacPHERSON.
PORTABLE MILLING MACHINE.
APPLICATION FILED MAY 20, 1921.
1,437,813.
Patented Dec. 5, 1922.
3 SHEETS—SHEET 1.
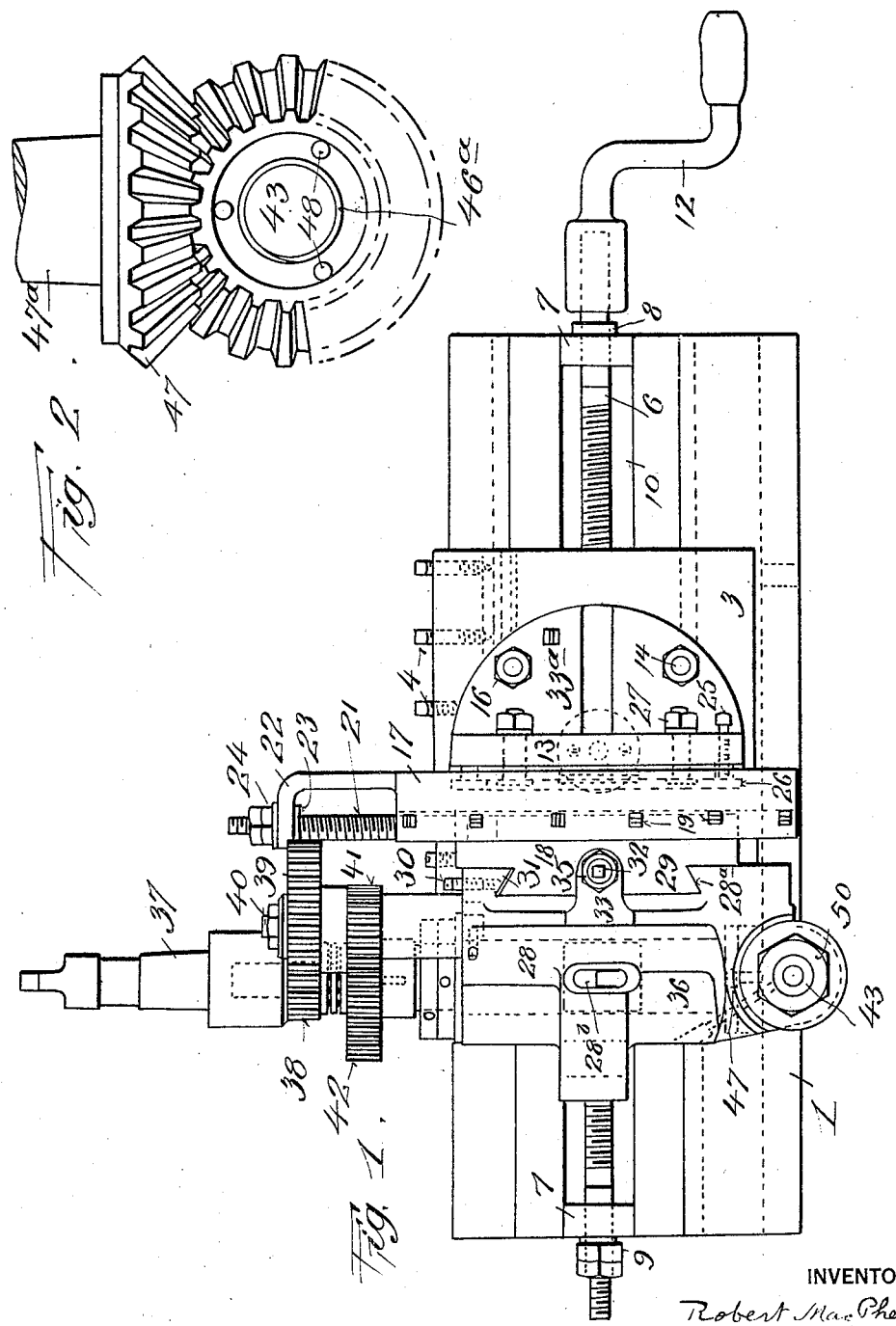
INVENTOR
Robert MacPherson
BY his ATTORNEY
T. F. Bourne

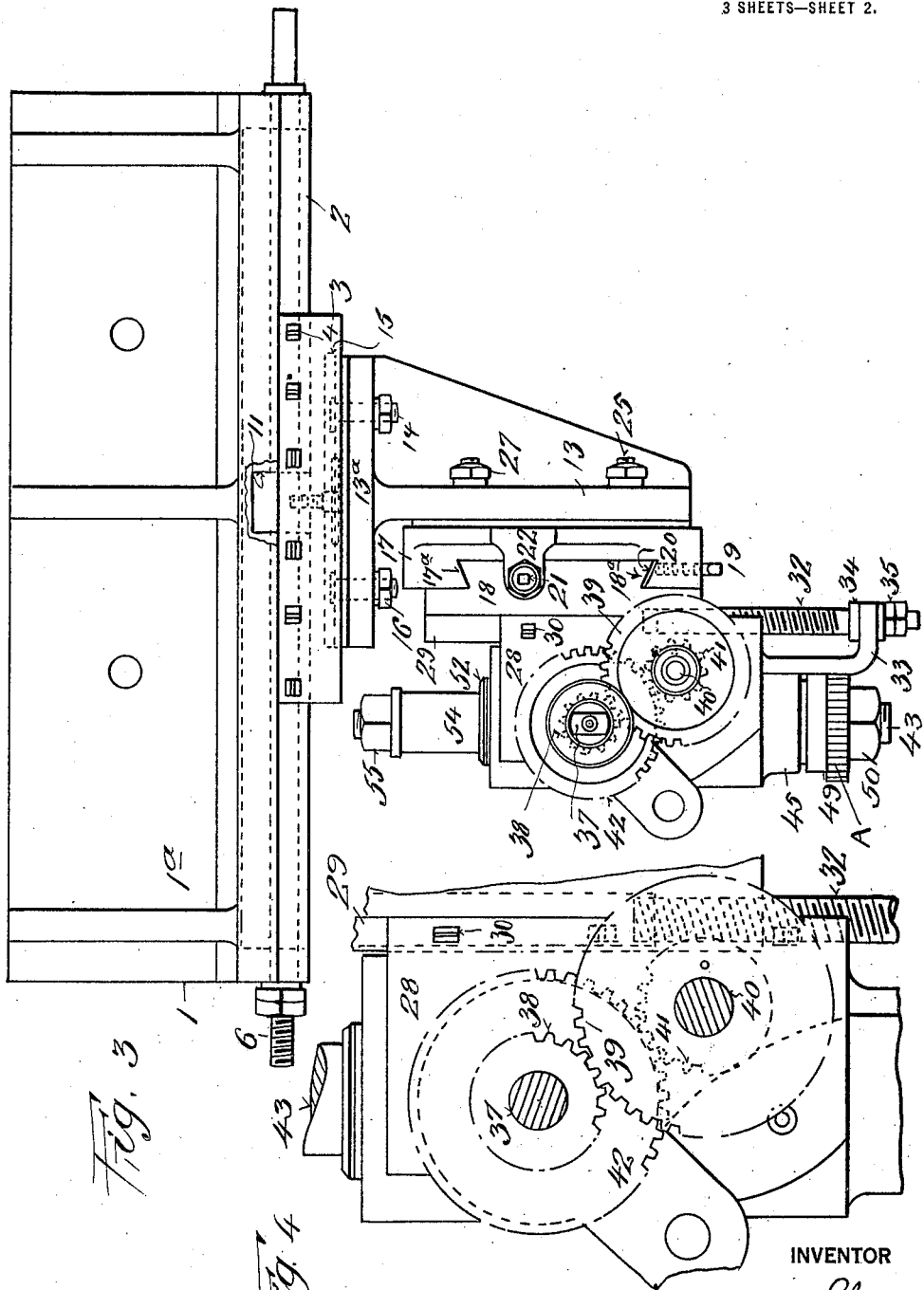

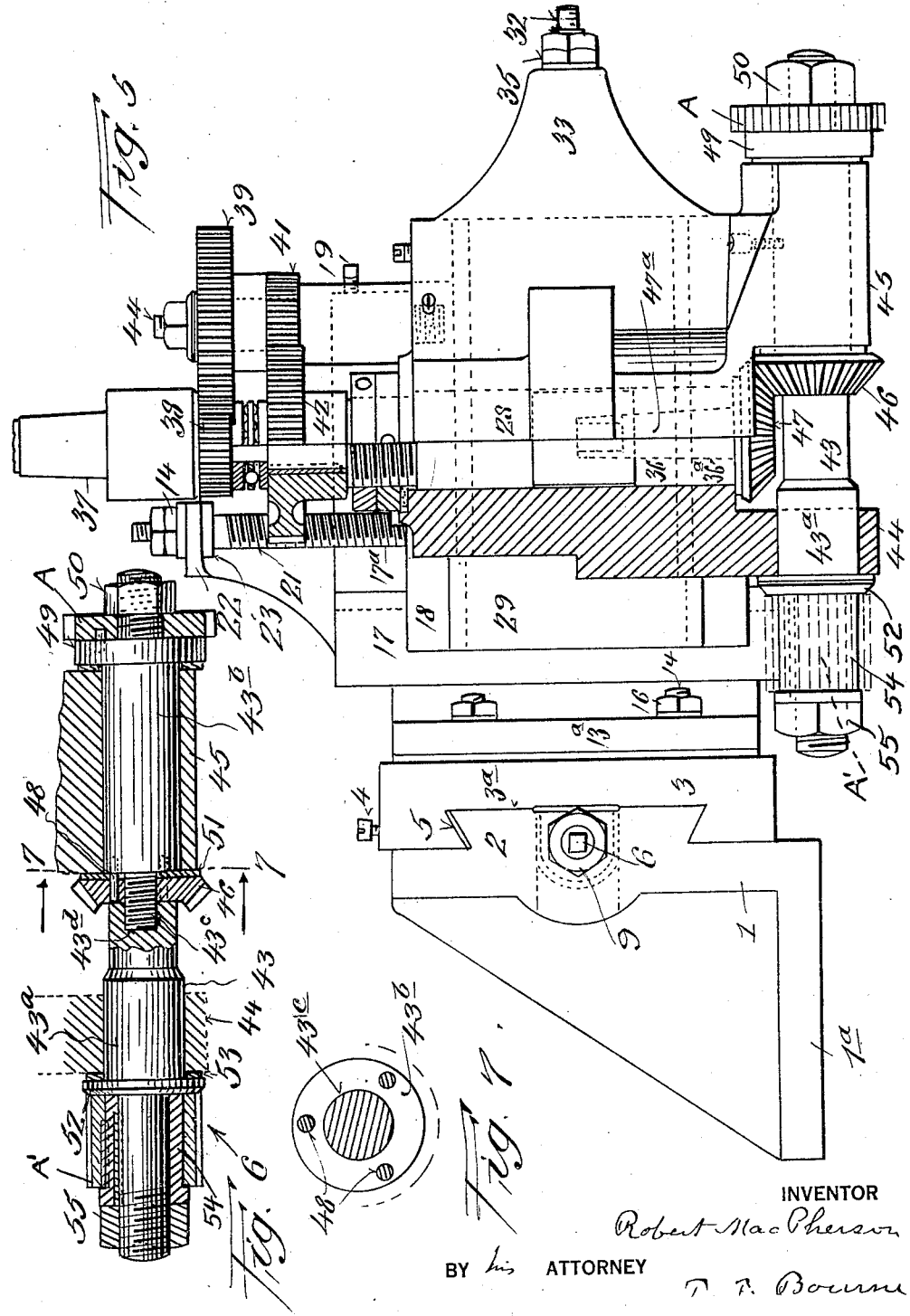

Patented Dec. 5, 1922.

1,437,813

UNITED STATES PATENT OFFICE.

ROBERT MacPHERSON, OF NEW YORK, N. Y.

PORTABLE MILLING MACHINE.

Application filed May 20, 1921. Serial No. 471,169.

*To all whom it may concern:*

Be it known that I, ROBERT MACPHERSON, a citizen of the United States, and resident of New York city, in the county of New York and State of New York, have invented certain new and useful Improvements in Portable Milling Machines, of which the following is a specification.

The object of my invention is to provide a portable tool capable of operating in the nature of a milling machine, drill or analogous machine tool, which can be moved to the work and operated in any desired location. My improved tool is adapted to be used for repair work on machines of large size to avoid the necessity of dismantling such machines for certain kinds of repairs or alterations thereon.

My invention comprises novel details of improvement that will be more fully hereinafter set forth, and then pointed out in the claims.

Reference is to be had to the accompanying drawings forming part hereof, wherein—

Fig. 1 is a side view of my improved tool; Fig. 2 is an enlarged detail view of drive gears for a milling cutter, saw or the like; Fig. 3 is a plan view; Fig. 4 is an enlarged detail plan view; partly in section; Fig. 5 is an enlarged end view, looking from the left in Fig. 1, partly in section; Fig. 6 is a detail sectional view illustrating the shaft for the cutting tool, and Fig. 7 is a cross section on line 7, 7 in Fig. 6.

Similar numerals of reference indicate corresponding parts in the several views.

The numeral 1 indicates a main support, which may be in the form of an angle-iron casting, shown provided with a longitudinal guideway along one face and a rearward flange $1^a$. A main slidable member 3 is adjustably guided upon guideway 2 by means of a groove $3^a$ in the rear face of said member, (Fig. 5). Screws 4 carried by member 3 cooperate with guideway 2, preferably by means of gib 5 to securely retain member 3 in set position on support 1. A screw 6 is journaled longitudinally along support 1 by means of bearings at 7, being retained from longitudinal movement by collar 8 on nut 9, (Fig. 1). Said screw is located in a longitudinal channel or groove 10 in the front face of guideway 2 and receives a nut or threaded projection 11 that extends rearwardly from member 3 into channel 10, (Fig. 3). Screw 6 may be rotated by crank 12 to adjust member 3 along support 1. Member 3 carries a bracket 13 having a base $13^a$ fitted to the outer side of member 3. Base $13^a$ is rotatively attached to member 3 by means of bolts 14 passing through said base and having their heads in circular T-slot 15 in member 3, (Fig. 3). Bracket 13 will be held firmly in adjusted position when nuts 16 are set tight against base $13^a$. Bracket 13 carries a guide member 17 adjustably supporting a block 18 by means of its guideway $17^a$ receiving guideway projection $18^a$ on said block, (Fig. 3). By means of screws 19 and gib 20 the block 18 may be held in set position on guide member 17. A screw 21 is journaled on arm 22 projecting from guide member 17 and cooperates with block 18 to adjust it on member 17. A collar 23 and nut 24 on screw 21 cooperate with arm 21 to rotatively retain the screw. The guide member 17 is rotatively retained on bracket 13 by bolts 25, the heads of which are located in annular T-slot 26 in member 17, (Fig. 1). When nuts 27 are set tight on bolts 25 against bracket 13 the guide member 17 will be held in axially adjusted position to correspondingly position block 18.

Block 18 adjustably carries a head 28 that is provided with means to support and drive a milling cutter or other tool. Block 18 has a transverse guide 29 on one side slidably receiving guide groove $28^a$ of head 28, (Fig. 1), whereby the head may be adjusted relatively to the block. By means of screws 30 and gib 31 the head may be secured in set position on block 18. A screw 32 cooperates with block 18 and is journaled in arm 33 on head 28 by means of collar 34 and nut 35, whereby said head may be adjusted along the block. The head 28 is provided with a drive shaft 36 rotatively supported in suitable bearings. (Fig. 5). By preference shaft 36 is rotated by suitable gearing from a drive spindle 37 adapted to be operated by suitable power, such as an electric or air motor (not shown) attached to said spindle in any well known way, to be moved about with the tool, flexible feed conductors or hose for the motor permitting supply of electric current or air to the motor in any position of the tool. Spindle 37 is provided with a pinion or gear 38 in mesh with a gear 39 rotative on a stud 40 carried by head 28. A pinion or gear 41 secured to gear 39 meshes with a gear 42 secured to shaft 36. The ratio of the gearing shown may be varied. Shaft 36 is intended to drive a milling cutter, saw, drill or other analogous tool. For the purpose of operating cutters, saws and the like I provide a shaft 43 journaled in bearings 44, 45 carried by head 28, and located at a right angle to shaft 36. Shaft 43 is provided with a gear 46 adapted to mesh with a gear 47 carried by shaft 36. Gear 47 is shown provided with a taper shank 47$^a$ engaging a taper socket 36$^a$ at the outer end of shaft 36. Shaft 43 and shank 47$^a$ with its gear 47 may be removed and a drill-end mill or milling cutter may be substituted in socket 36$^a$. Head 28$^a$ is shown provided with a hole 28$^b$ (Fig. 1), for insertion of a tool to dislodge shank 47$^a$ or a drill from socket 36$^a$.

For convenience in assembling shaft 43 and gears 46, 47 on head 28 I prefer to form shaft 43 in two parts 43$^a$, 43$^b$ respectively journaled in bearings 44, 45 with gear 46 therebetween. Shaft part 43$^b$ is shown provided with an extended threaded part 43$^c$, (Fig. 6), screwing into corresponding recess 43$^d$ in shaft part 43$^a$ after passing through a hole 46$^a$ in gear 46, (Figs. 2 and 6), whereby the gear is clamped between the shaft parts. Pins 48 projecting from shaft part 43$^b$ into holes in gear 46 aid in rotating the latter. Washer 49 and nut 50 on shaft 43 retain the shaft in position in conjunction with washer 51. A cutter or saw A may be secured on shaft 43 by washer 49 and nut 50. A shoulder 52 on shaft 43$^a$ in conjunction with washer 53 resists thrust of the shaft. A sleeve 54 on shaft part 43$^a$ with nut 55 provides for retaining a cutting tool A on the shaft.

My improved tool provides simple and effective means to operate a cutting instrument or tool in various relations and at different angles according to the work to be accomplished, being particularly adapted to be supported upon or adjacent to a machine to be repaired or altered. The support 1 may be secured by suitable clamping means upon a machine to be repaired and various adjustments of the components of my tool may be made to present the cutter or drill to the work. Member 3 may be fed to the work by screw 6 to feed the cutter or shaft 43, bracket 13 may be adjusted axially as required; block 18 may be adjusted, or fed to the work, on member 17, and the latter may be adjusted axially on bracket. All such adjustments and feedings correspondingly affect head 28 and the cutter or tool supported thereby, and said head may be adjusted or fed by screw 32. The entire machine tool may be supported at any desired angle and close adjustments for the work to be done may be effected by the components of the tool. Various usually costly and difficult operations may be performed with the tool, such as boring, drilling or tapping, and cutting key-ways, grooves or slots, either straight or with angular portions, since a cutter may be fed in various directions by operating any of the screws 6, 21 and 32 in desired order. By means of my improvements repairs and alterations on machinery, engines and the like may be made in situ, in many instances, without requiring dismantling of the parts, removal to machine tools, and reassembling, thereby effecting a great saving in accomplishing such work.

A head 28 without bearings 44, 45 shaft 43, and gears 46, 47, but having the taper socket 36$^a$ for a drill, may be substitutes for the head described having said bearings, shaft and gears, where certain kinds of drilling is to be performed.

Changes may be made in the details and arrangements of parts set forth, within the scope of the appended claims, without departing from the spirit of my invention.

Having now described my invention, what I claim is:

1. A portable machine tool comprising a support, a member slidably carried thereby, means to feed said member along the support, a head provided with means to support and drive a tool, a bracket rotatively carried by said member, means to retain the bracket in rotative positions of adjustment, a block slidably and rotatively carried by the bracket, means to retain the block in angular positions of adjustment on the bracket, means to feed the block at an angle to the feeding of the member, and means supporting the head upon the block for movement at an angle to the feeding of the block.

2. A portable machine tool comprising a support, a member slidably carried thereby, means to feed said member along the support, a head provided with means to support and drive a tool, a bracket rotatively carried by said member, means to retain the bracket in rotative positions of adjustment, a block slidably and rotatively carried by the bracket, means to retain the block in angular positions of adjustment on the bracket, means to feed the block at an angle to the feeding of the member, means supporting the head upon the block for movement at an angle to the direction of feed of the block, and means to feed the head on the block.

3. A portable machine tool comprising a support, a member slidably carried thereby, means to feed the member along the support, a head movably carried by said member and provided with a drive shaft, said head having a shaft journaled at an angle to the first named shaft and provided with means to retain a tool, and gearing connecting said shafts for rotating one by the other.

4. A portable machine tool comprising a support, a member slidably carried thereby, means to feed the member along the support, a head movably carried by said member and provided with a drive shaft, said head having a shaft journaled at an angle to the first named shaft and provided with means to retain a tool, said shaft comprising a plurality of parts, a gear secured between said shaft parts, and a gear secured to the first named shaft above the first named gear and in mesh therewith.

5. A portable machine tool comprising a support, a member slidably carried thereby, means to feed the member along the support, a head movably carried by said member and provided with a drive shaft, said shaft being provided with means to retain a tool, said head having spaced bearings at an angle to the first named shaft, a shaft journaled in said bearings beyond the first named shaft, the second named shaft being provided with means to retain a tool, and meshing gears upon said shafts between said bearings.

6. A portable machine tool comprising a support, a member slidably carried thereby, means to feed the member along the support, a head movably carried by said member and provided with a drive shaft, said shaft being provided with means to retain a tool, said head having a spindle for connection with a motor, and gearing connecting said spindle and shaft for rotating the latter by the former, said tool retaining means being adapted to detachably retain one of said gears.

Signed at New York city, in the county of New York, and State of New York, this 19th day of May A. D., 1921.

ROBERT MacPHERSON.